(12) United States Patent
Kennedy

(10) Patent No.: US 11,002,388 B2
(45) Date of Patent: May 11, 2021

(54) FIRE HYDRANT NOZZLE

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 0 days.

(21) Appl. No.: 16/881,645

(22) Filed: May 22, 2020

(65) Prior Publication Data
US 2020/0284380 A1 Sep. 10, 2020

Related U.S. Application Data

(63) Continuation of application No. 15/934,188, filed on Mar. 23, 2018, now Pat. No. 10,865,915.

(51) Int. Cl.
*F16L 15/00* (2006.01)
*A62C 31/02* (2006.01)
*A62C 35/20* (2006.01)
*F16K 27/00* (2006.01)

(52) U.S. Cl.
CPC ............ *F16L 15/001* (2013.01); *A62C 31/02* (2013.01); *A62C 35/20* (2013.01); *F16K 27/006* (2013.01)

(58) Field of Classification Search
CPC ........... F16L 15/001; A62C 31/02; E03B 9/04
See application file for complete search history.

(56) References Cited

U.S. PATENT DOCUMENTS

| 4,000,753 | A | ‡ | 1/1977 | Ellis | E03B 9/04 137/296 |
| 4,141,574 | A | ‡ | 2/1979 | Stansifer | E03B 9/02 137/296 |
| 4,402,531 | A | ‡ | 9/1983 | Kennedy, Jr. | F16L 55/1155 285/14 |
| 6,199,254 | B1 | ‡ | 3/2001 | Suresh | B25B 27/10 29/237 |
| 6,447,027 | B1 | * | 9/2002 | Lilley | F16L 37/113 285/148.19 |
| 6,450,553 | B1 | ‡ | 9/2002 | Suresh | B21D 39/04 285/382 |
| 6,733,045 | B2 | ‡ | 5/2004 | Harrington | F16L 37/252 285/143.1 |
| 7,416,223 | B1 | ‡ | 8/2008 | Sulmone | F16L 15/008 285/13 |

(Continued)

*Primary Examiner* — Kevin R Barss
(74) *Attorney, Agent, or Firm* — Brown & Michaels, PC

(57) ABSTRACT

A fire hydrant nozzle includes an annular sleeve, which has an annular wall, an inlet end, and an outlet end. The inlet end has a fire hydrant connection element extending from the inlet end and configured to couple with a fire hydrant outlet. The fire hydrant connection element has a portion protruding radially inward, the portion protruding radially inward configured to be moved with respect to the outlet end to connect with the fire hydrant outlet. Another embodiment includes an inlet end and an outlet end, the outlet end configured to couple with a fire hose, the inlet end having a fire hydrant connection element and a first portion with a wall thickness less than a wall thickness of the outlet end. The first portion of the inlet end is configured to be bent to facilitate movement of the fire hydrant connection element into connection with a fire hydrant.

25 Claims, 5 Drawing Sheets

(56) References Cited

U.S. PATENT DOCUMENTS 8,905,060 B2 ‡ 12/2014 Schlesinger ............ F16K 35/10
                                                            137/315.41
9,429,262 B2 ‡ 8/2016 Ericksen ............... F16L 37/091
9,604,404 B2 ‡ 3/2017 Ericksen ............... F16L 43/008

\* cited by examiner
‡ imported from a related application

FIRE HYDRANT NOZZLE

REFERENCE TO RELATED APPLICATIONS

This application is a continuation of co-pending U.S. patent application Ser. No. 15/934,188, entitled "Fire Hydrant Nozzle", filed Mar. 23, 2018. The aforementioned application is incorporated herein by reference.

BACKGROUND OF THE INVENTION

Field of the Invention

The invention pertains to the field of fire hydrants. More particularly, the invention pertains to a nozzle of a fire hydrant.

Description of Related Art

A fire hydrant is an above-ground connection that provides access to a water supply for the purpose of fighting fires. The water supply may be pressurized, as in the case of hydrants connected to water mains buried in the street, or unpressurized, as in the case of hydrants connected to nearby ponds or cisterns. Every hydrant has one or more outlets, equipped with a nozzle, to which a fire hose may be connected. If the water supply is pressurized, the hydrant will also have one or more valves to regulate the water flow. In order to provide sufficient water for firefighting, hydrants are sized to provide a minimum flowrate of about 250 gallons per minute (945 liters per minute), although most hydrants can provide much more.

The upper section, or upper barrel of a fire hydrant is usually molded in cast or ductile iron. The hydrant bonnet is usually made from the same material as the barrel, and hydrant nozzles, to which fire hoses can connect, are usually molded in bronze, which is a less malleable material facilitating more precision sizing and better life. The nozzle requires repetitive, water-tight connection to, and disconnection from, a fire hose at an outlet end. At an inlet end, the nozzle must be securely connected to the outlet of the upper barrel. Conventionally, the nozzles are threaded into the outlets of the barrel.

SUMMARY OF THE INVENTION

In one embodiment, a fire hydrant nozzle includes an annular sleeve. The annular sleeve has an annular wall, an inlet end, and an outlet end. The inlet end has a fire hydrant connection element extending from the inlet end and configured to couple with a fire hydrant outlet, and the outlet end has a fire hose connection element configured to couple with a fire hose. The fire hydrant connection element has a portion protruding radially inward, the portion protruding radially inward being configured to be moved with respect to the outlet end to connect with the fire hydrant outlet.

In another embodiment, a fire hydrant includes a fire hydrant outlet and an annular sleeve coupled to the fire hydrant outlet. The annular sleeve has an annular wall, an inlet end, and an outlet end. A fire hydrant connection element extends from the inlet end. The fire hydrant connection element and the annular sleeve are non-elastically deformed radially outward to engage the fire hydrant outlet. The outlet end has a fire hose connection element configured to couple with a fire hose.

In another embodiment, a fire hydrant nozzle includes an inlet end and an outlet end. The outlet end is configured to couple with a fire hose. The inlet end has a fire hydrant connection element and a first portion with a wall thickness less than a wall thickness of the outlet end. The fire hydrant connection element is configured to couple with a fire hydrant outlet. The first portion of the inlet end is configured to be bent to facilitate movement of the fire hydrant connection element into connection with a fire hydrant.

DETAILED DESCRIPTION OF THE INVENTION

Figure 1:
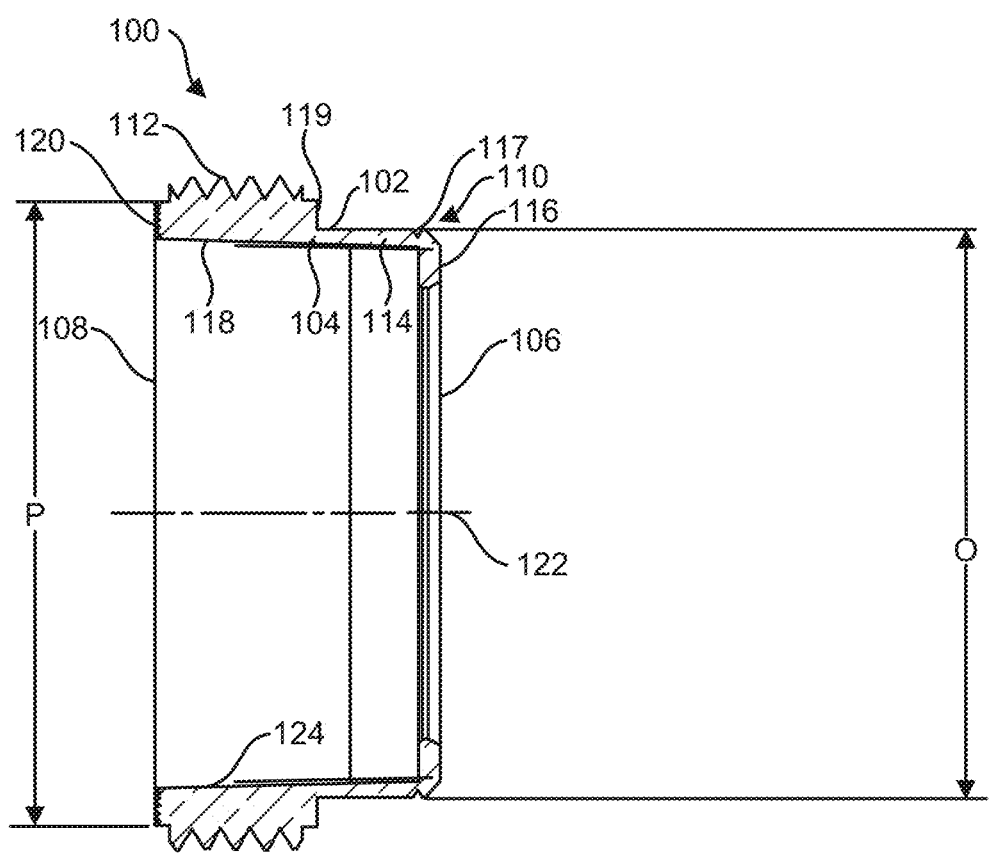
FIG. 1 shows a sectional side view of a fire hydrant nozzle according to an embodiment of the invention.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
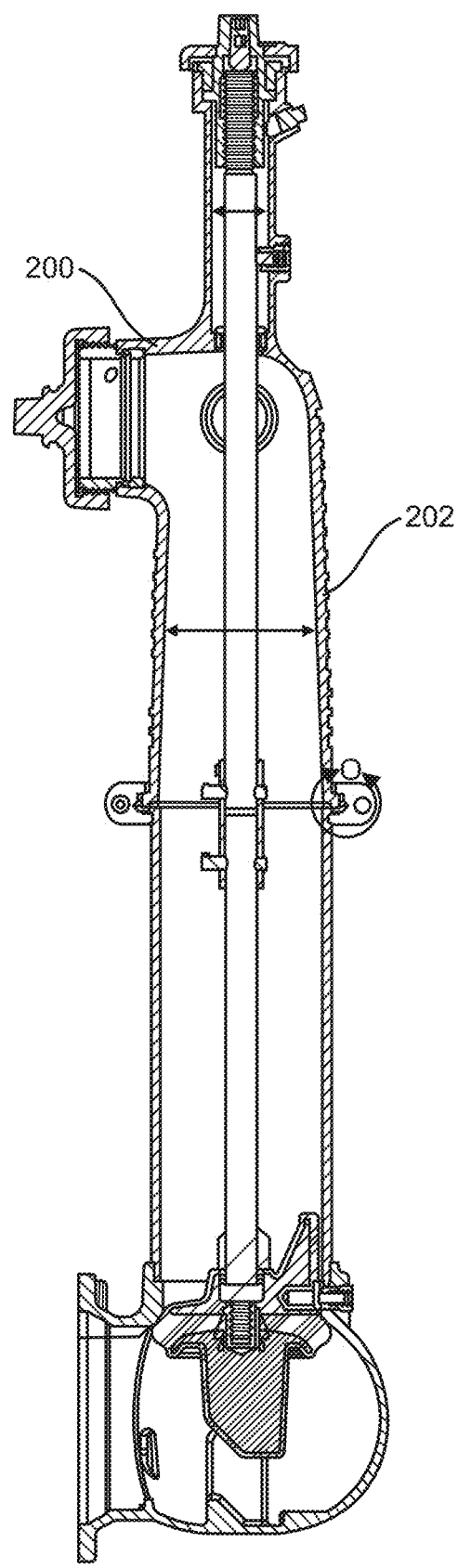
FIG. 2 shows a sectional side view of the fire hydrant nozzle assembled in an outlet of a fire hydrant, according to the embodiment of the fire hydrant nozzle illustrated in FIG. 1.
Figure 3:
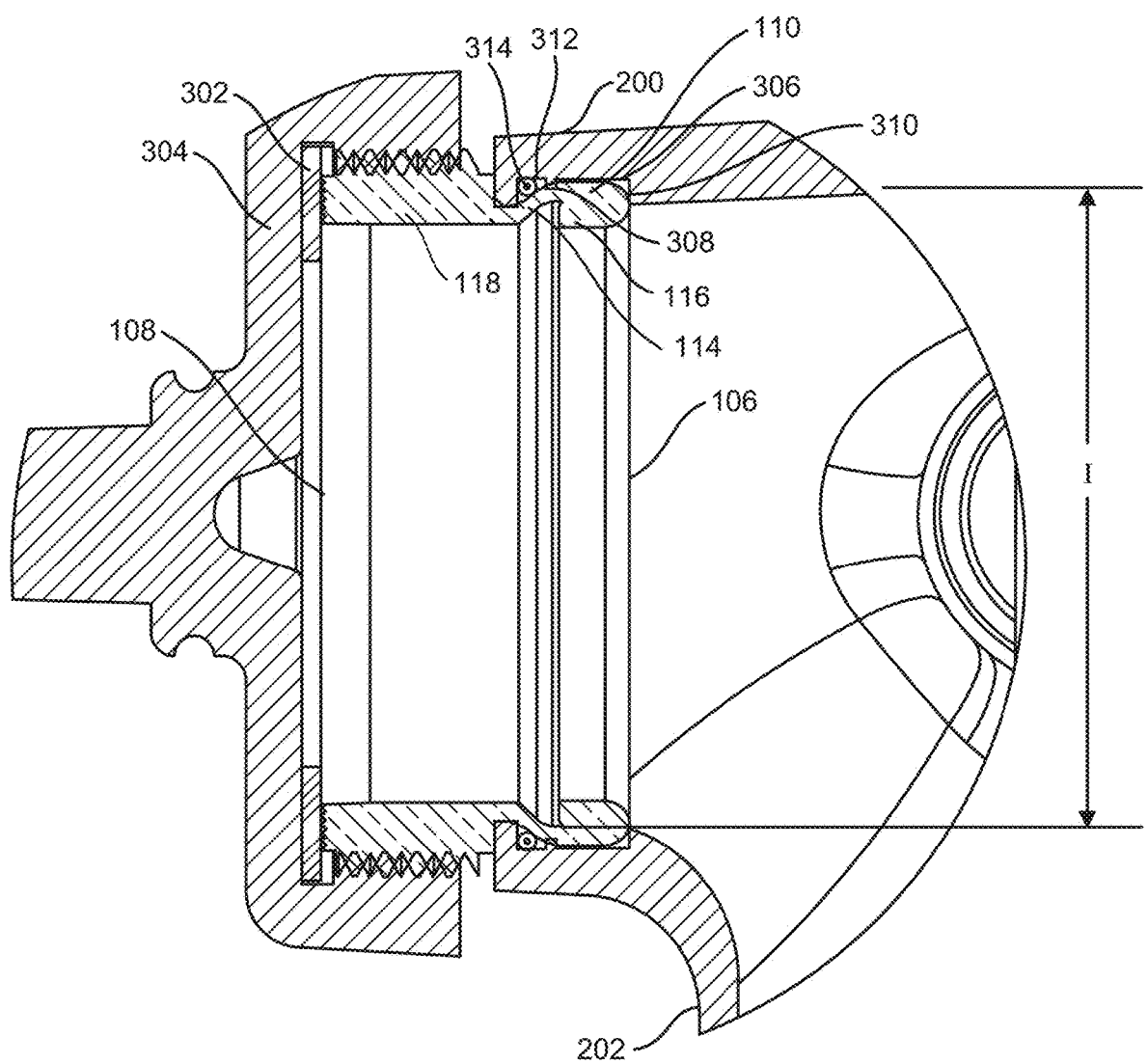
FIG. 3 shows a detailed view of the fire hydrant nozzle assembled in the outlet of a fire hydrant shown in FIG. 2.

FIG. 1 shows a sectional side view of a fire hydrant nozzle 100 configured to couple with a fire hydrant outlet 200 (see FIGS. 2 and 3), and to provide a durable, water-tight connector for a fire hose (not shown). A sectional side view of the fire hydrant nozzle 100 assembled in, or coupled to, the fire hydrant outlet 200 is shown in FIG. 2. FIG. 3 shows the fire hydrant nozzle 100 and fire hydrant outlet 200 of FIG. 2 in greater magnification.

Referring to FIGS. 1-3, the fire hydrant nozzle 100 has the general shape of an annular sleeve 102, which can be particularly shaped and sized to fit various outlets of various fire hydrants and to fit fire hoses. The depicted fire hydrant outlet 200 is generally cylindrical, and fire hose connectors are typically generally cylindrical, so the nozzle 100 is accordingly generally cylindrical to engage the fire hoses and the fire hydrant outlet 200.

The annular sleeve 102 has an annular wall 104, an inlet end 106, and an outlet end 108. When the nozzle 100 is installed in a fire hydrant 202, water can flow out of the fire hydrant 202 through the nozzle 100, from the inlet end 106 of the nozzle 100 to the outlet end 108 of the nozzle 100, and to a fire hose if a fire hose is connected to the outlet end 108. The inlet end 106 has a fire hydrant connection element 110 configured to couple with the fire hydrant outlet 200, and the outlet end 108 has a fire hose connection element 112 configured to couple with a fire hose. Fire hoses usually have internal threads to screw the fire hoses onto fire hydrant outlets. Accordingly, the fire hose connection element 112 illustrated in the figures has external threads to engage with a fire hose. The fire hose connection element 112, however, can include any now-known or later-developed structure to couple with any now-known or future-developed fire hose.

Referring to FIG. 1, the fire hydrant connection element 110 can include a first portion 114 of the annular wall 104, and can include a radially inward protruding portion 116, which can extend inward from the first portion 114. An annular groove 117 can also be located in the annular wall 104 either entirely in the first portion 114 or at the joint between the first portion 114 and the radially inward protruding portion 116. The radially inward protruding portion 116 can include an axially extreme point of the annular sleeve 104 and/or a radially inwardly extreme point of the annular sleeve 102.

Referring to FIGS. 1 and 3, an outer diameter O of the first portion 114 of the annular wall 104 is sized to fit within an inner diameter I of the fire hydrant outlet 200. A step 119 from the outer diameter O to a larger outer diameter P of a second portion 118 of the annular wall 104 can be located at a boundary between the first portion 114 and the second portion 118, to create a stop surface (119) against which the fire hydrant outlet 200 is configured to abut as a result of inserting the fire hydrant nozzle 100 into the fire hydrant outlet 200.

Referring again to FIG. 1, the first portion 114 and the radially inward protruding portion 116 are configured to be swaged, or deformed radially outward to engage the fire hydrant outlet 202 (FIGS. 2 and 3) and secure the nozzle 100 to the outlet 200. To assist deflection of the first portion 114, the annular wall 104 at the first portion 114 is relatively thin compared to the annular wall 104 at the second portion 118 of the annular wall 104, and/or compared to the radially inward protruding portion 116. Further, the annular groove 117 can facilitate proper deformation of the radially inward protruding portion 116 relative to the first portion 114, and relative to the fire hydrant outlet 200 (FIGS. 2 and 3), as is discussed further herein below.

Referring to FIGS. 1 and 3, the outlet end 108 of the annular sleeve 102 includes the second portion 118 of the annular wall 104. This second portion 118 can be thicker than the first portion 114, to provide more strength and durability for repeated connections and disconnections with fire hoses. Fire hoses are typically internally threaded, and to engage these internal threads, the fire hose connection element includes external threads 112. It is conceived that the outlet end 108 can alternatively have any connection structure to match the connection structure on a fire hose. Also at the outlet end 108, a textured surface 120 can face approximately parallel to an axis of symmetry 122 of the annular sleeve 102. This textured surface 120 facilitates mating and sealing with a gasket or O-ring 302, which can be positioned between the nozzle 100 and a fire hydrant outlet cap 304 or a fire hose.

Referring to FIG. 1, an inner diameter of the annular sleeve 102 can taper from the outlet end 108 toward the inlet end 106, which can facilitate insertion of a swaging tool clearing the inner surface 124 at the second portion 118, and contacting the inner surface 124 at the first portion 114, or having the least clearance with the inner surface 124 at the first portion 114. Referring to FIG. 3, as a result of inserting the swaging tool (not shown) through the nozzle 100, e.g., from the inlet end 106 to the outlet end 108, the fire hydrant connection element 110 can be bent radially outward to engage the fire hydrant outlet 200. The radially inward protruding portion 116 and the first portion 114 are bent and moved radially outward by the swaging tool (not shown) to press into a recess 306 in the inner surface of the fire hydrant outlet 200. For example, the swaging tool (not shown) can pivot the radially inward protruding portion 116 and, at least in part because the radially inward protruding portion 116 can be thicker than the first portion 114, the swaging tool can push the radially inward protruding portion 116 further radially outward. The radially outward movement of the radially inward projecting portion 116 pulls the first portion 114 radially outward as well at the connection between the radially inward projecting portion 116 and the first portion 114.

The inner recess 306 can have an annular radially inward protruding notch 308, which can divide the recess 306 into two adjacent recesses—a first recess portion 310 and a second recess portion 312. The radially inward extending portion 116 can press into and fit within the first recess portion 310; the annular groove 117 can align with and accept the radially inward protruding notch 308; and the first portion 114 can bend toward and over the second recess portion 312. An O-ring 314 can be positioned in the second recess portion 312, and the first portion 114 can be pressed against it to create a seal between the fire hydrant outlet 200 and the fire hydrant nozzle 100. The thickness of the radially inward protruding portion 116 can be configured such that the swaging tool presses the radially inward protruding portion 116 the appropriate amount to press into and lock within the recess 306 and/or the first recess portion 310.

Figure 4:
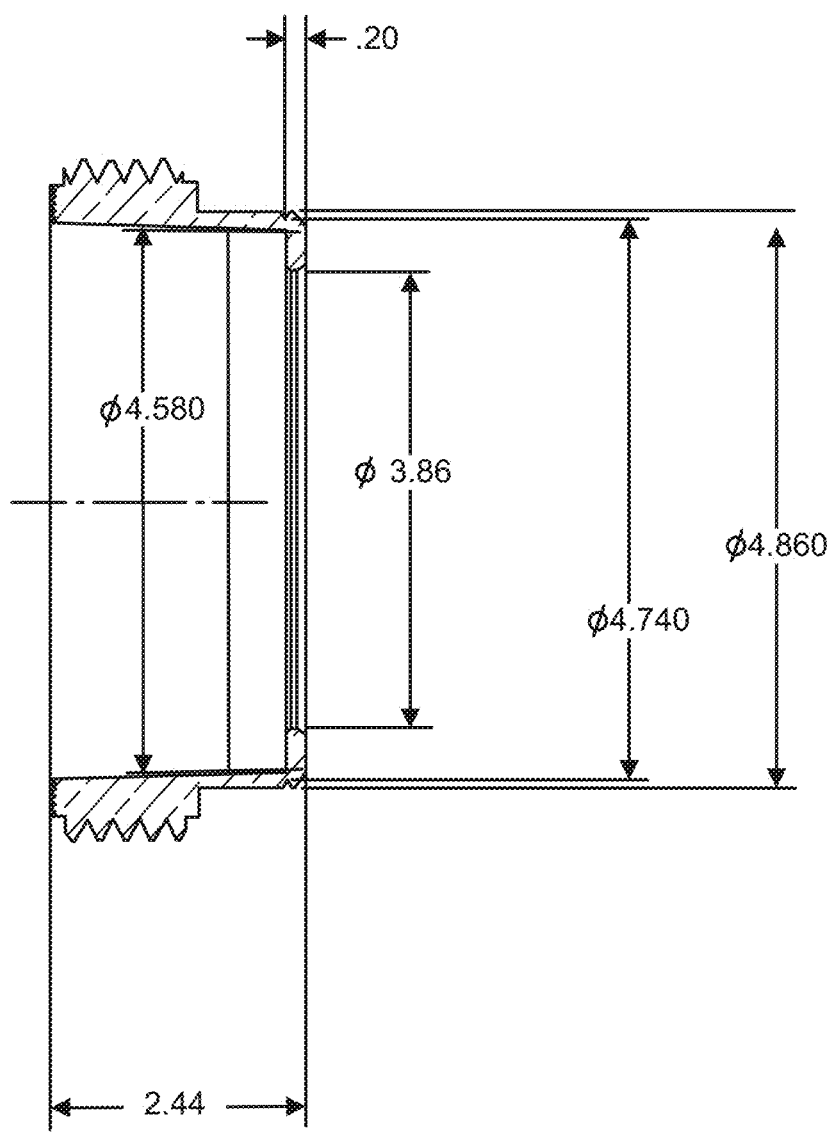
FIG. 4 shows the sectional side view illustrated in FIG. 1, showing examples of dimensions.
Figure 5:
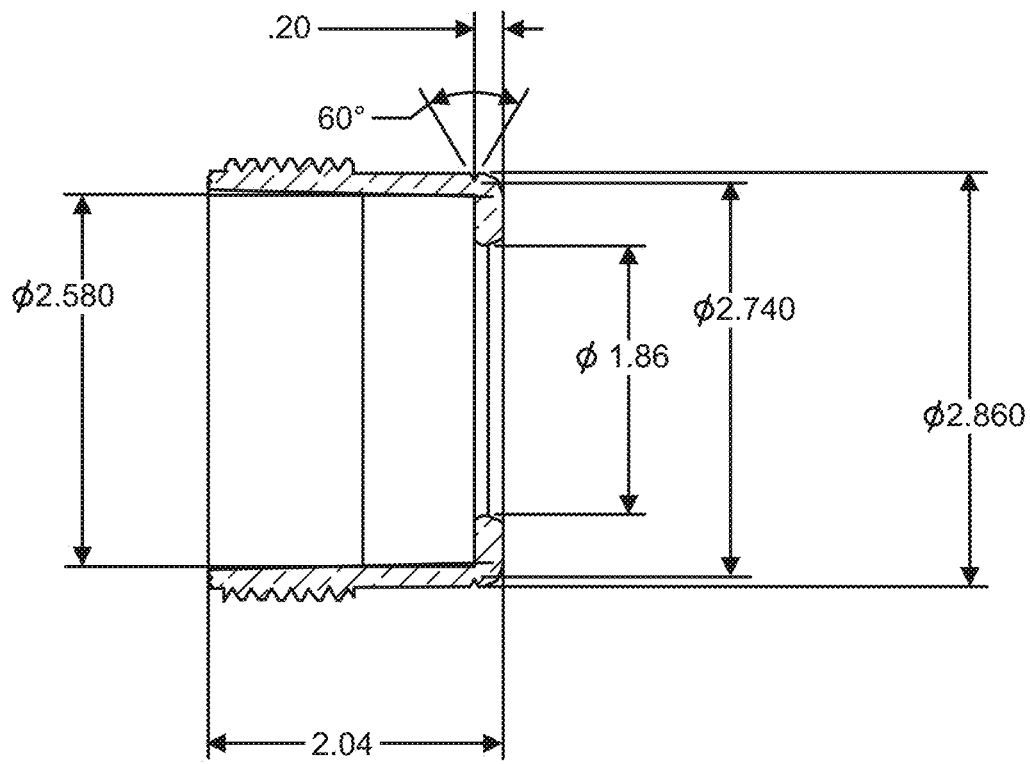
FIG. 5 shows a sectional side view with example dimensions, according to an embodiment of the invention.

FIG. 4 shows the sectional side view illustrated in FIG. 1, providing examples of dimensions (in inches) for the nozzle 100. FIG. 5 shows a sectional side view with further example dimensions (in inches) of the nozzle 100. The dimensions provided are merely intended to be an example and are not intended to be limiting. The dimensions can vary to fit different fire hydrant outlets.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A fire hydrant nozzle comprising:
    an annular sleeve, the annular sleeve having an annular wall, an inlet end, and an outlet end, the outlet end having a fire hose connection element configured to couple with a fire hose; and
    a fire hydrant connection element extending from the inlet end of the annular sleeve and including a first portion of the annular wall of the annular sleeve, the outlet end including a second portion of the annular wall, the fire hydrant connection element configured to couple with a fire hydrant outlet, the fire hydrant connection element having a portion protruding radially inward, the portion protruding radially inward configured to be moved with respect to the outlet end to connect with the fire hydrant outlet,
    the first portion of the annular wall being thinner than the second portion of the annular wall.

2. The fire hydrant nozzle of claim 1, wherein the portion protruding radially inward is thicker than the first portion of the annular wall.

3. The fire hydrant nozzle of claim 1, wherein an outer radius of the annular sleeve steps inward at a boundary between the first portion of the annular wall and the second portion of the annular wall, to create a stop surface against which the fire hydrant outlet is configured to abut when inserting the fire hydrant nozzle into the fire hydrant outlet.

4. The fire hydrant nozzle of claim 1, wherein the portion protruding radially inward includes an axially extreme point of the annular sleeve.

5. The fire hydrant nozzle of claim 1, wherein the first portion of the annular wall has an annular groove.

6. The fire hydrant nozzle of claim 1, wherein a diameter of the annular sleeve tapers from the outlet end of the annular wall toward the inlet end of the annular wall.

7. The fire hydrant nozzle of claim 1, wherein the outlet end of the annular wall includes a textured surface facing parallel to an axis of symmetry of the annular sleeve.

8. The fire hydrant nozzle of claim 1, wherein a radial length of the portion protruding radially inward is greater than a radial thickness of the annular wall.

9. The fire hydrant nozzle of claim 1, wherein the portion protruding radially inward is annular.

10. A fire hydrant comprising:
    a fire hydrant outlet;
    an annular sleeve coupled to the fire hydrant outlet, the annular sleeve having an annular wall, an inlet end, and an outlet end, the outlet end having a fire hose connection element configured to couple with a fire hose; and
    a fire hydrant connection element extending from the inlet end, the fire hydrant connection element and the annular sleeve non-elastically deformed radially outward to engage the fire hydrant outlet, the fire hydrant connection element including a first portion of the annular wall, the outlet end of the annular sleeve including a second portion of the annular wall, the first portion of the annular wall being thinner than the second portion of the annular wall.

11. The fire hydrant of claim 10, wherein the fire hydrant connection element is bent radially outward at the first portion of the annular wall.

12. The fire hydrant of claim 10, wherein an outer radius of the annular sleeve steps inward at a boundary between the first portion of the annular wall and the second portion of the annular wall, to create a stop surface against which the fire hydrant outlet abuts.

13. The fire hydrant of claim 10, wherein the fire hydrant outlet includes a first annular recess configured to receive an O-ring seal, and includes a second annular recess to receive an end portion of the fire hydrant connection element.

14. The fire hydrant of claim 13, wherein the first recess is adjacent to the second recess, the first recess being separated from the second recess by an annular, radially inward protrusion, and wherein the fire hydrant connection element includes a first portion of the annular wall, the first portion of the annular wall having an annular groove, the radially inward protrusion engaging the annular groove.

15. The fire hydrant of claim 10, wherein a diameter of the annular sleeve tapers from the outlet end of the annular wall toward the inlet end of the annular wall.

16. The fire hydrant of claim 10, wherein the outlet end includes a textured surface facing parallel to an axis of symmetry of the annular sleeve.

17. A fire hydrant nozzle comprising:
    an inlet end; and
    an outlet end,
    the outlet end being configured to couple with a fire hose,
    the inlet end having a fire hydrant connection element configured to couple with a fire hydrant outlet, and having a first portion with a wall thickness less than a wall thickness of the outlet end, the first portion configured to be bent to facilitate movement of the fire hydrant connection element into connection with a fire hydrant.

18. The nozzle of claim 17, wherein the first portion comprises an annular groove around an outside surface thereof and a radially inward protruding end portion, the annular groove creating a joint where the radially inward protruding end portion begins.

19. A fire hydrant comprising:
    a fire hydrant outlet;
    an annular sleeve coupled to the fire hydrant outlet, the annular sleeve having an annular wall, an inlet end, and an outlet end, the outlet end having a fire hose connection element configured to couple with a fire hose; and
    a fire hydrant connection element extending from the inlet end, the fire hydrant connection element and the annular sleeve non-elastically deformed radially outward to engage the fire hydrant outlet,
    an outer radius of the annular sleeve stepping inward at a boundary between the first portion of the annular wall and the second portion of the annular wall, to create a stop surface against which the fire hydrant outlet abuts.

20. A fire hydrant comprising:
    a fire hydrant outlet;

an annular sleeve coupled to the fire hydrant outlet, the annular sleeve having an annular wall, an inlet end, and an outlet end, the outlet end having a fire hose connection element configured to couple with a fire hose; and a fire hydrant connection element extending from the inlet end, the fire hydrant connection element and the annular sleeve non-elastically deformed radially outward to engage the fire hydrant outlet, the fire hydrant outlet including a first annular recess configured to receive an O-ring seal, and including a second annular recess to receive an end portion of the fire hydrant connection element.

21. A fire hydrant comprising:
a fire hydrant outlet;
an annular sleeve coupled to the fire hydrant outlet, the annular sleeve having an annular wall, an inlet end, and an outlet end, the outlet end having a fire hose connection element configured to couple with a fire hose; and
a fire hydrant connection element extending from the inlet end, the fire hydrant connection element and the annular sleeve non-elastically deformed radially outward to engage the fire hydrant outlet,
a diameter of the annular sleeve tapering from the outlet end of the annular wall toward the inlet end of the annular wall.

22. A fire hydrant nozzle comprising:
an annular sleeve, the annular sleeve having an annular wall, an inlet end, and an outlet end, the outlet end having a fire hose connection element configured to couple with a fire hose; and
a fire hydrant connection element extending from the inlet end of the annular sleeve and including a first portion of the annular wall of the annular sleeve, the outlet end including a second portion of the annular wall, the fire hydrant connection element configured to couple with a fire hydrant outlet, the fire hydrant connection element having a portion protruding radially inward, the portion protruding radially inward configured to be moved with respect to the outlet end to connect with the fire hydrant outlet,
an outer radius of the annular sleeve stepping inward at a boundary between the first portion of the annular wall and the second portion of the annular wall, to create a stop surface against which the fire hydrant outlet is configured to abut when inserting the fire hydrant nozzle into the fire hydrant outlet.

23. A fire hydrant nozzle comprising:
an annular sleeve, the annular sleeve having an annular wall, an inlet end, and an outlet end, the outlet end having a fire hose connection element configured to couple with a fire hose; and
a fire hydrant connection element extending from the inlet end of the annular sleeve, the fire hydrant connection element configured to couple with a fire hydrant outlet, the fire hydrant connection element having a portion protruding radially inward, the portion protruding radially inward configured to be moved with respect to the outlet end to connect with the fire hydrant outlet, the portion protruding radially inward including an axially extreme point of the annular sleeve.

24. A fire hydrant nozzle comprising:
an annular sleeve, the annular sleeve having an annular wall, an inlet end, and an outlet end, the outlet end having a fire hose connection element configured to couple with a fire hose; and
a fire hydrant connection element extending from the inlet end of the annular sleeve, the fire hydrant connection element configured to couple with a fire hydrant outlet, the fire hydrant connection element having a portion protruding radially inward, the portion protruding radially inward configured to be moved with respect to the outlet end to connect with the fire hydrant outlet,
wherein a diameter of the annular sleeve tapers from the outlet end toward the inlet end.

25. A fire hydrant nozzle comprising:
an annular sleeve, the annular sleeve having an annular wall, an inlet end, and an outlet end, the outlet end having a fire hose connection element configured to couple with a fire hose; and
a fire hydrant connection element extending from the inlet end of the annular sleeve, the fire hydrant connection element configured to couple with a fire hydrant outlet, the fire hydrant connection element having a portion protruding radially inward, the portion protruding radially inward configured to be moved with respect to the outlet end to connect with the fire hydrant outlet,
wherein a radial length of the portion protruding radially inward is greater than a radial thickness of the annular wall.

* * * * *